United States Patent
Saylor et al.

(10) Patent No.: US 9,076,006 B1
(45) Date of Patent: Jul. 7, 2015

(54) SHARING ELECTRONIC RESOURCES

(71) Applicant: MicroStrategy Incorporated, Vienna, VA (US)

(72) Inventors: Michael J. Saylor, Vienna, VA (US); Hector Vazquez, Ashburn, VA (US); Gang Chen, Vienna, VA (US); Sergey Mironenko, Ellicott City, MD (US)

(73) Assignee: MicroStrategy Incorporated, Vienna, VA (US)

( * ) Notice: Subject to any disclaimer, the term of this patent is extended or adjusted under 35 U.S.C. 154(b) by 138 days.

(21) Appl. No.: 13/791,216

(22) Filed: Mar. 8, 2013

Related U.S. Application Data

(60) Provisional application No. 61/731,780, filed on Nov. 30, 2012.

(51) Int. Cl.
*G06F 21/60* (2013.01)
*H04L 29/06* (2006.01)
*G06F 21/62* (2013.01)

(52) U.S. Cl.
CPC .......... *G06F 21/606* (2013.01); *G06F 21/6218* (2013.01); *H04L 63/08* (2013.01)

(58) Field of Classification Search
USPC ....................................... 726/4; 709/218, 219
See application file for complete search history.

(56) References Cited

U.S. PATENT DOCUMENTS

| | | | |
|---|---|---|---|
| 8,510,381 B1 * | 8/2013 | Birand et al. ................. | 709/204 |
| 2010/0082784 A1 * | 4/2010 | Rosenblatt et al. ........... | 709/222 |
| 2012/0176976 A1 * | 7/2012 | Wells ............................ | 370/329 |

OTHER PUBLICATIONS

Wikipedia, "Certificate authority," Wikipedia [online] Aug. 8, 2012 [retrieved on Aug. 15, 2012]. Retrieved from the Internet: <URL: http://en.wikipedia.org/wiki/Certificate_authority>, 4 pages.

Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.

Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.

(Continued)

*Primary Examiner* — Brandon Hoffman
*Assistant Examiner* — Samuel Ambaye
(74) *Attorney, Agent, or Firm* — Fish & Richardson P.C.

(57) ABSTRACT

A method performed by one or more processing devices, comprising: receiving information corresponding to an electronic resource of a first user; generating a resource identifier for the electronic resource of the first user; receiving a request for access to an electronic resource that is shared with a second user of the second client device; identifying, based on the first information, that the electronic resource of the first user is the electronic resource for which the second user is requesting access; determining, in response to the request, second information that is based on the received first information; determining a correspondence between the first information and the second information; determining that the second user of the second client device is authorized to access the electronic resource of the first user; and enabling the second client device to access the electronic resource of the first user.

20 Claims, 10 Drawing Sheets

(56) References Cited

OTHER PUBLICATIONS

Wikipedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.

Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.

Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.

Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.

Wikipedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.

Wikipedia, "Public-key cryptography," Wikipedia [online] Aug. 15, 2012 [retrieved on Aug. 15, 2012]. Retrieved from the Internet: <URL: http://en.wikipedia.org/wiki/Public-key_cryptography>, 12 pages.

Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_Infrastructure>, 6 pages.

Wikipedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.

Wikipedia, "Two-factor authentication," Wikipedia [online] Aug. 13, 2012 [retrieved on May 15, 2012]. Retrieved from the Internet: <URL: http://en.wikipedia.org/wiki/Two-factor_authentication>, 15 pages.

* cited by examiner

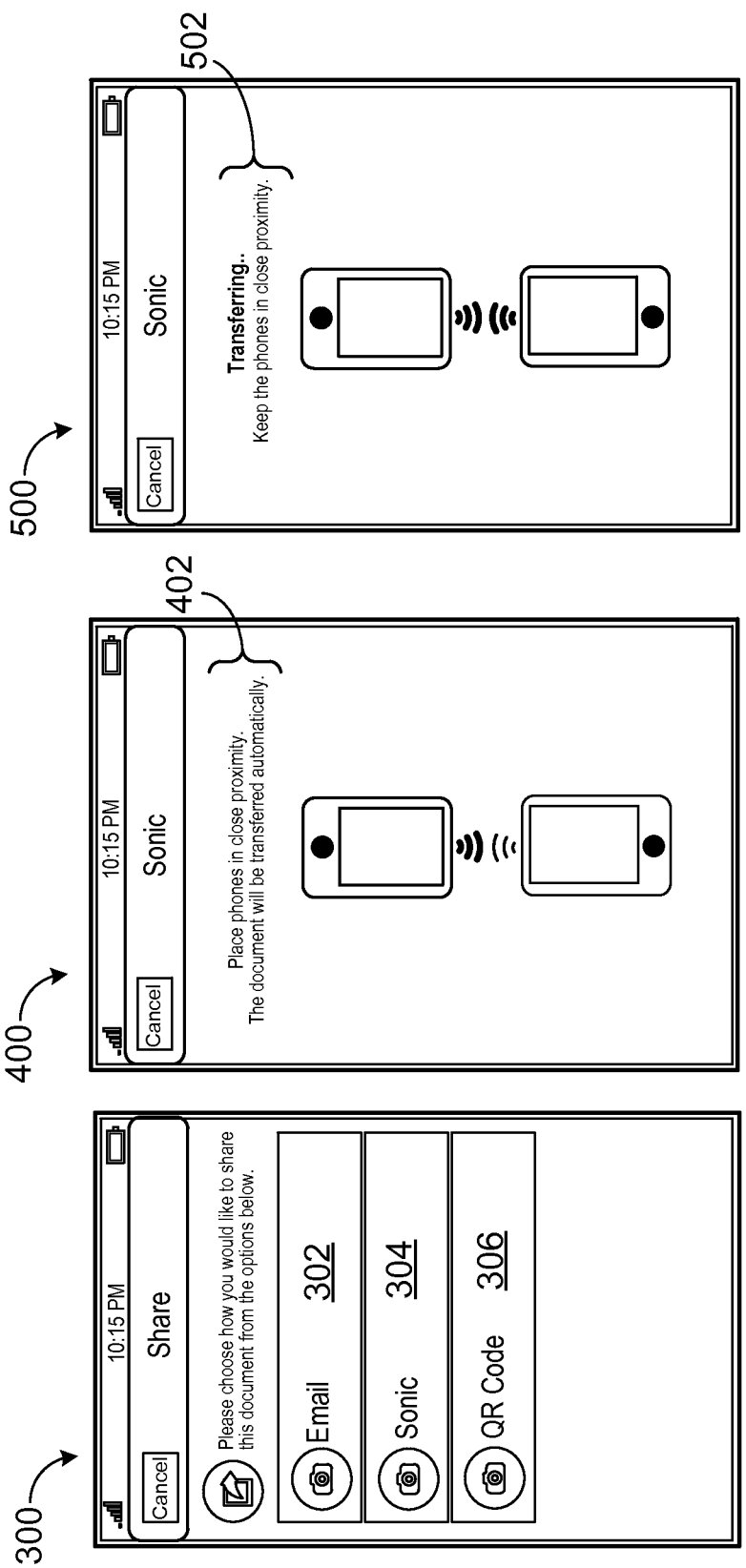

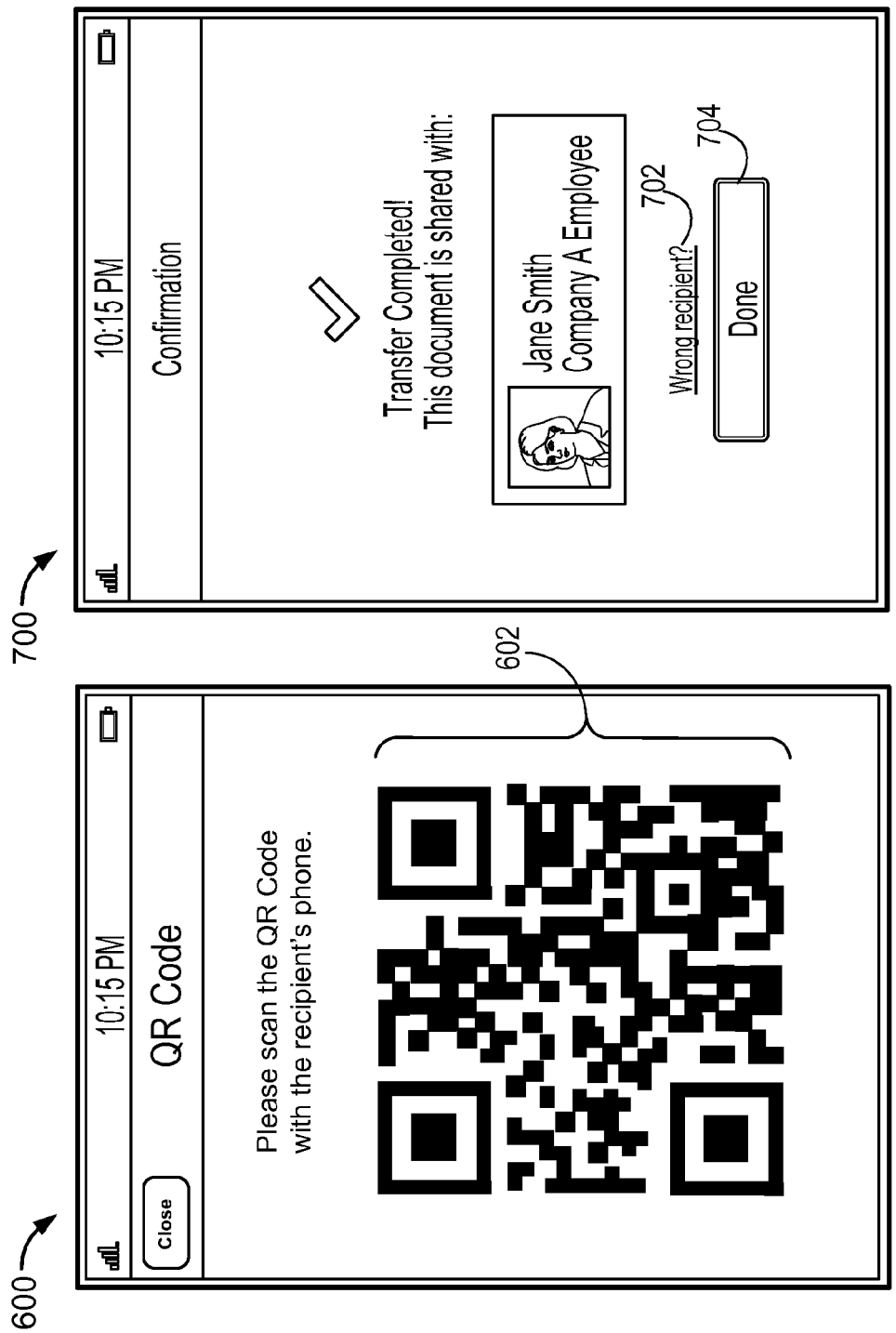

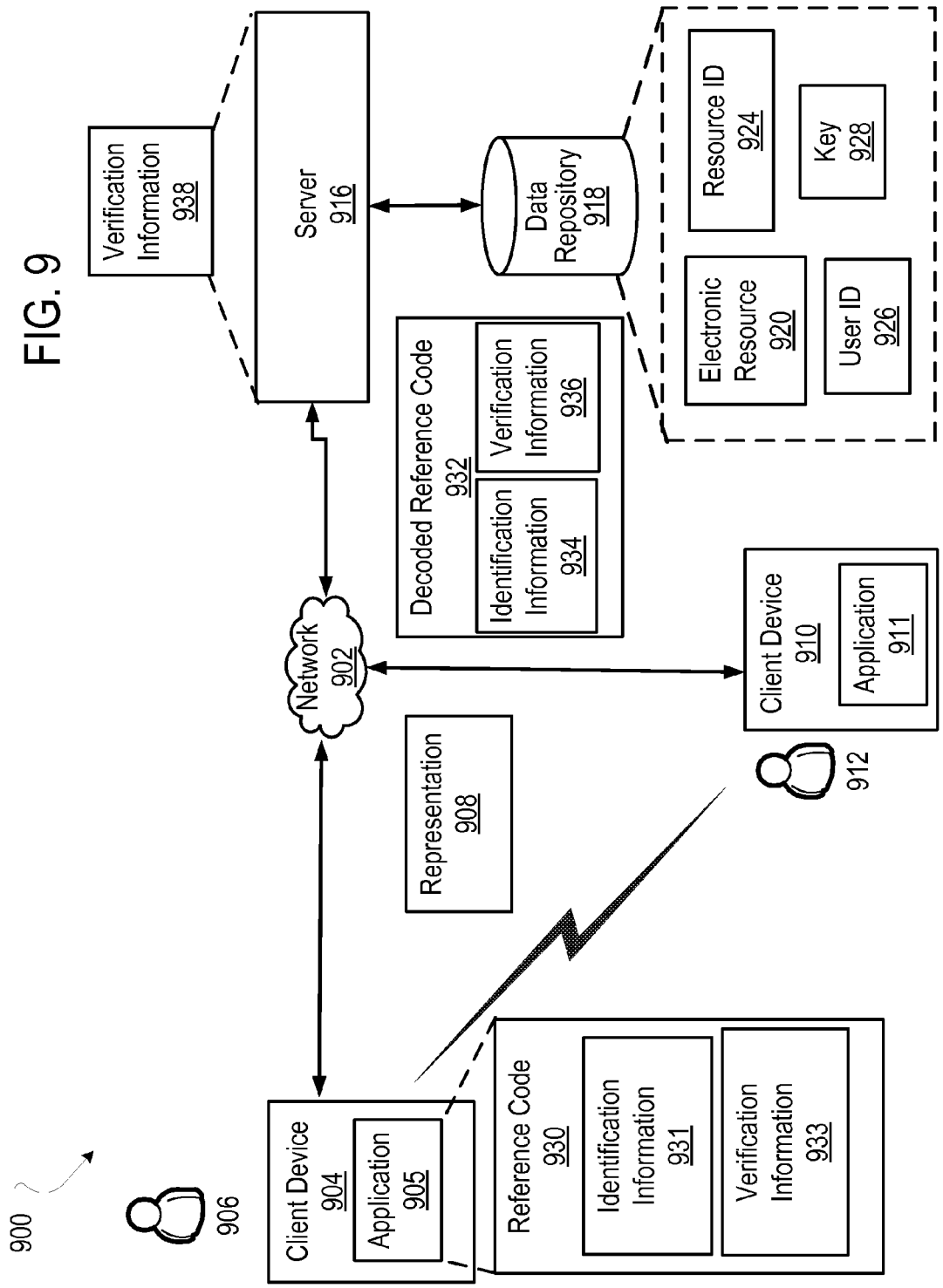

SHARING ELECTRONIC RESOURCES

CLAIM OF PRIORITY

This application claims priority under 35 U.S.C. §119(e) to U.S. Provisional Patent Application No. 61/731,780, filed Nov. 30, 2012, the entire contents of which are hereby incorporated by reference.

BACKGROUND

A server may be used to store documents that have been uploaded to the server by various users. Users may access the uploaded documents using applications running on the users' client devices.

SUMMARY

In one aspect of the present disclosure, a method performed by one or more processing devices includes receiving, from a first client device, information corresponding to an electronic resource of a first user, wherein the first user is associated with the first client device; generating a resource identifier for the electronic resource of the first user, wherein the resource identifier is used in generating a reference code for the electronic resource of the first user, and wherein the reference code promotes sharing of the electronic resource of the first user with another user of another client device; receiving, from a second client device, a request for access to an electronic resource that is shared with a second user of the second client device, wherein the request comprises first information, wherein the first information is based on a reference code for the electronic resource that is shared with the second user; identifying, based on the first information, that the electronic resource of the first user is the electronic resource for which the second user is requesting access; determining, in response to the request, second information that is based on the received first information; determining a correspondence between the first information and the second information; as a consequence of having determined the correspondence between the first information and the second information, determining that the second user of the second client device is authorized to access the electronic resource of the first user; and as a consequence of having determined that the second user of the second client device is authorized to access the electronic resource of the first user, enabling the second client device to access the electronic resource of the first user.

Implementations of the disclosure can include one or more of the following features. In some implementations, the first information comprises a decoded representation of the reference code for the electronic resource that is shared with the second user. In other implementations, the first information being based on the reference code for the electronic resource that is shared with the second user comprises the first information being based on a representation of the reference code for the electronic resource that is shared with the second user; wherein the representation comprises one or more of an ultrasonic audio signal representation and an optical machine-readable representation. In still other implementations, the method includes transmitting, to the first client device, the resource identifier; and wherein the first client device generates the reference code for the electronic resource of the first user based on the resource identifier.

In yet other implementations, the request received from the second client device provides an indication of the second user of the second client device. In some implementations, the reference code for the electronic resource of the first user is usable a single time to retrieve the electronic resource of the first user. In still other implementations, the method includes invalidating the reference code for the electronic resource of the first user after determining that the second user of the second client device is authorized to access the electronic resource of the first user. In still other implementations, the method includes storing the information corresponding to the electronic resource of the first user in association with the resource identifier, prior to generation of the resource code for the electronic resource of the first user.

In still other implementations, the electronic resource of the first user is associated with a credential for the first user of the first client device; wherein access, by the second user, to the electronic resource of the first user is conditioned on the second user having a credential that corresponds to the credential for the first user; and wherein determining that the second user of the second client device is authorized to access the electronic resource of the first user further comprises: determining a correspondence between a credential of the second user of the second client device and the credential for the first user of the first client device, and as a consequence of having determined the correspondence between the credential of the second user of the second client device and the credential for the first user of the first client device and having determined the correspondence between the first information and the second information, determining that the second user of the second client device is authorized to access the electronic resource of the first user.

In yet other implementations, the electronic resource of the first user is digitally signed using a private key of the first user of the first client device; and the method further comprises: using a public key associated with the first user and maintained by the second client device to verify that contents of the electronic resource of the first user, at a time when the second client device is enabled to access the electronic resource of the first user, are unchanged from contents of the electronic resource of the first user, at a time when the information corresponding to the electronic resource of the first user is received.

In still other implementations, the request received from the second client device includes an electronic signature of an application on the second client device to indicate to the one or more processing devices that the request originated from the application on the second client device. In some implementations, the method includes sending, to the first client device, a notification of enabling the second user of the second client device to access the electronic resource of the first user. In still other implementations, the method includes after enabling the second user of the second client device to access the electronic resource of the first user, receiving, from the first client device, information requesting that the second user's authorization to access the electronic resource of the first user be terminated; and as a consequence of having received the information requesting that the second user's access to the electronic resource of the first user be terminated, terminating the second user's authorization to access the electronic resource of the first user. In still other implementations, the resource identifier is associated with a credential identifier for the first user.

In still another aspect of the disclosure, one or more machine-readable media are configured to store instructions that are executable by one or more processing devices to perform operations including receiving, from a first client device, information corresponding to an electronic resource of a first user, wherein the first user is associated with the first client device; generating a resource identifier for the electronic resource of the first user, wherein the resource identifier is used in generating a reference code for the electronic resource of the first user, and wherein the reference code promotes sharing of the electronic resource of the first user with another user of another client device; receiving, from a second client device, a request for access to an electronic resource that is shared with a second user of the second client device, wherein the request comprises first information, wherein the first information is based on a reference code for the electronic resource that is shared with the second user; identifying, based on the first information, that the electronic resource of the first user is the electronic resource for which the second user is requesting access; determining, in response to the request, second information that is based on the received first information; determining a correspondence between the first information and the second information; as a consequence of having determined the correspondence between the first information and the second information, determining that the second user of the second client device is authorized to access the electronic resource of the first user; and as a consequence of having determined that the second user of the second client device is authorized to access the electronic resource of the first user, enabling the second client device to access the electronic resource of the first user. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform operations including: receiving, from a first client device, information corresponding to an electronic resource of a first user, wherein the first user is associated with the first client device; generating a resource identifier for the electronic resource of the first user, wherein the resource identifier is used in generating a reference code for the electronic resource of the first user, and wherein the reference code promotes sharing of the electronic resource of the first user with another user of another client device; receiving, from a second client device, a request for access to an electronic resource that is shared with a second user of the second client device, wherein the request comprises first information, wherein the first information is based on a reference code for the electronic resource that is shared with the second user; identifying, based on the first information, that the electronic resource of the first user is the electronic resource for which the second user is requesting access; determining, in response to the request, second information that is based on the received first information; determining a correspondence between the first information and the second information; as a consequence of having determined the correspondence between the first information and the second information, determining that the second user of the second client device is authorized to access the electronic resource of the first user; and as a consequence of having determined that the second user of the second client device is authorized to access the electronic resource of the first user, enabling the second client device to access the electronic resource of the first user. Implementations of this aspect of the present disclosure can include one or more of the foregoing features.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

FIGS. 1-7, 8A and 8B illustrate examples of graphical user interfaces for an example application that enables sharing of electronic resources.

FIG. 9 is a block diagram of an example of a network environment that enables the sharing of electronic resources.

DETAILED DESCRIPTION

Figure 1:
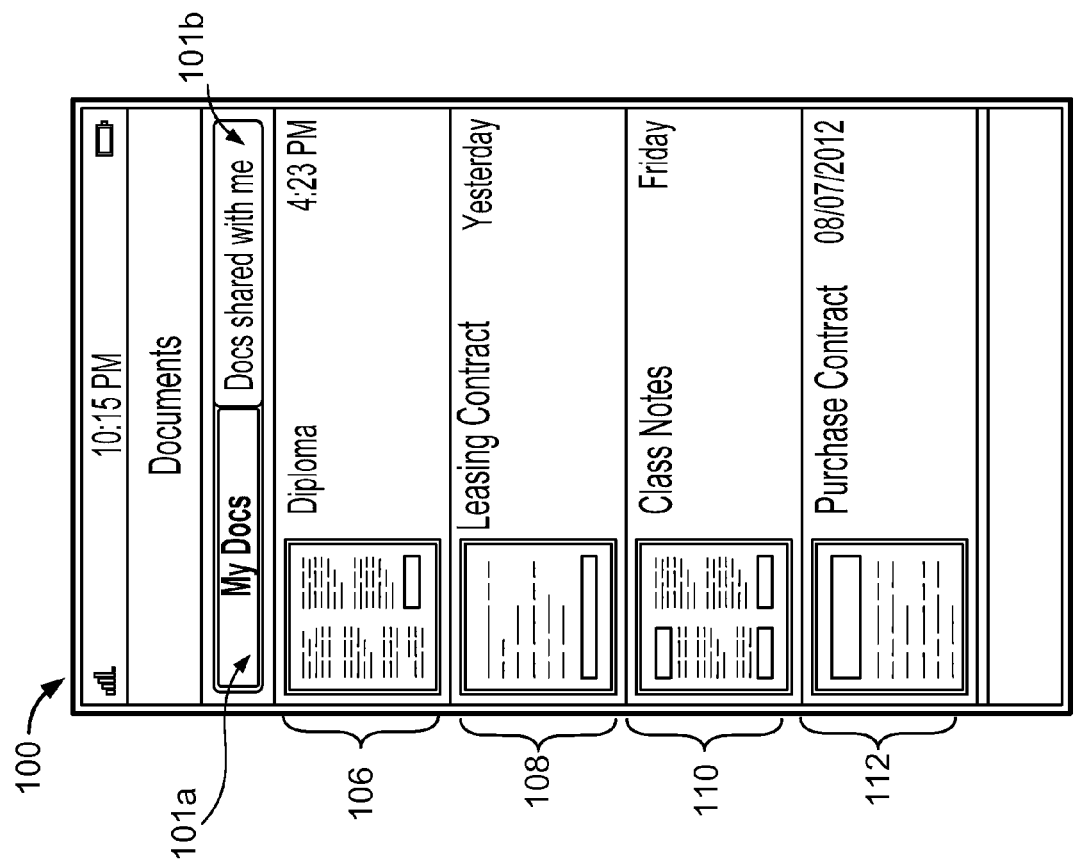

A system consistent with this disclosure implements an application (e.g., a mobile identity management application) for providing a user of the application with a representation that is associated with the user, including, e.g., a representation of a credential of the user. Generally, a credential includes information that identifies a person as being associated with a particular entity and/or as being authorized to access various types of resources or information. A representation of a credential includes an electronic representation of a credential.

In an example, a credential may be evidence of authority, status, rights, or entitlement to privileges that can be, for example, a badge to gain entrance to a location, an identifier for membership in a group (e.g., a graduate of a school or a professional certification), a ticket for entry to an event, a redeemable voucher, a key that unlocks a lock and/or disables an alarm (e.g., for entry to a location), forms of personal identification (e.g., drivers' licenses, identity cards, passports, etc.), forms of identification for gaining access to information technology (IT) resources (e.g., credentials for logging into a computing device, network, or other computing resource, credentials for accessing an electronic file, directory, or other storage component, and so forth), forms of identification for accessing an electronic account (e.g., credentials for accessing a bank account from a personal computing device and/or an automated teller machine (ATM)), and so forth. In this example, there are numerous types of representations of a credential, including, e.g., a numeric or an alphanumeric representation, an ultrasonic audio signal representation, an animated graphical representation, a parametrically-generated graphical representation, an audio representation of a phrase and an optical machine-readable representation (e.g., a bar code or a quick response (QR) code), each of which are described in further detail below.

The application also enables the user to upload an electronic resource to a server and to associate the uploaded electronic resource with a reference for the electronic resource. An electronic resource includes an item of data that may be accessible from a network. There are various types of electronic resources, including, e.g., HTML pages, web pages, web sites, word processing documents, portable document format (PDF) documents, images, videos, audio files, applications, and so forth. Following uploading of the electronic resource, the user can present a representation of the reference to the electronic resource to another user's device in order to share the electronic resource with the other user. In this example, a resource sharer includes a user who shares an electronic resource with another user. A resource recipient includes a user with whom the electronic resource is shared.

In this example, the resource recipient uses a computing device to receive the representation of the reference to the electronic resource from the resource sharer. In an example, the representation includes a QR code within which the reference to the electronic resource is encoded. In this example, the resource recipient uses a scanner (e.g., a camera) on the resource recipient's computing device to scan (e.g., photograph) the QR code into the resource recipient's computing device. In another example, the representation includes an ultrasonic audio signal within which the reference to the electronic resource is encoded. In this example, the resource recipient uses a microphone on the resource recipient's computing device to receive the ultrasonic audio signal.

The resource recipient's computing device decodes the reference to the electronic resource received from the resource sharer. The resource recipient's computing device uses the decoded reference to query the server for the shared electronic resource. In an example, the representation of the reference to the electronic resource may be valid for only a single use, such that a new representation is required for any subsequent transfers of the electronic resource.

FIG. 1 illustrates an example of graphical user interface 100 for an example of an application that enables the sharing of electronic resources. In the example of FIG. 1, a client device (not shown) displays graphical user interface 100 for a user (not shown). In the example of FIG. 1, the client device implements the application (not shown) for displaying electronic resources that are available to the user within the application. In this example, graphical user interface 100 is one of the graphical user interfaces rendered by the application. In this example, some of the electronic resources may be stored locally on the client device. Others of the electronic resources may be stored remotely on a server that is configured for communication with the client device. In this example, the client device may access the remotely stored electronic resources from the server.

In the example of FIG. 1, some of the electronic resources may be owned by the user, while some other electronic resources may be owned by other entities, but shared with the user. Based on a selection of one of control 101a or control 101b, graphical user interface 100 can switch between views that show the list of electronic resources owned by the user and the list of electronic resources shared with the user, respectively. In the example of FIG. 1, control 101a is selected, such that graphical user interface 100 displays indicators 106, 108, 110, 112 of electronic resources that are owned by the user. In this example, an electronic resource (e.g., electronic resource 202 in FIG. 2) is associated with indicator 106.

Figure 2:
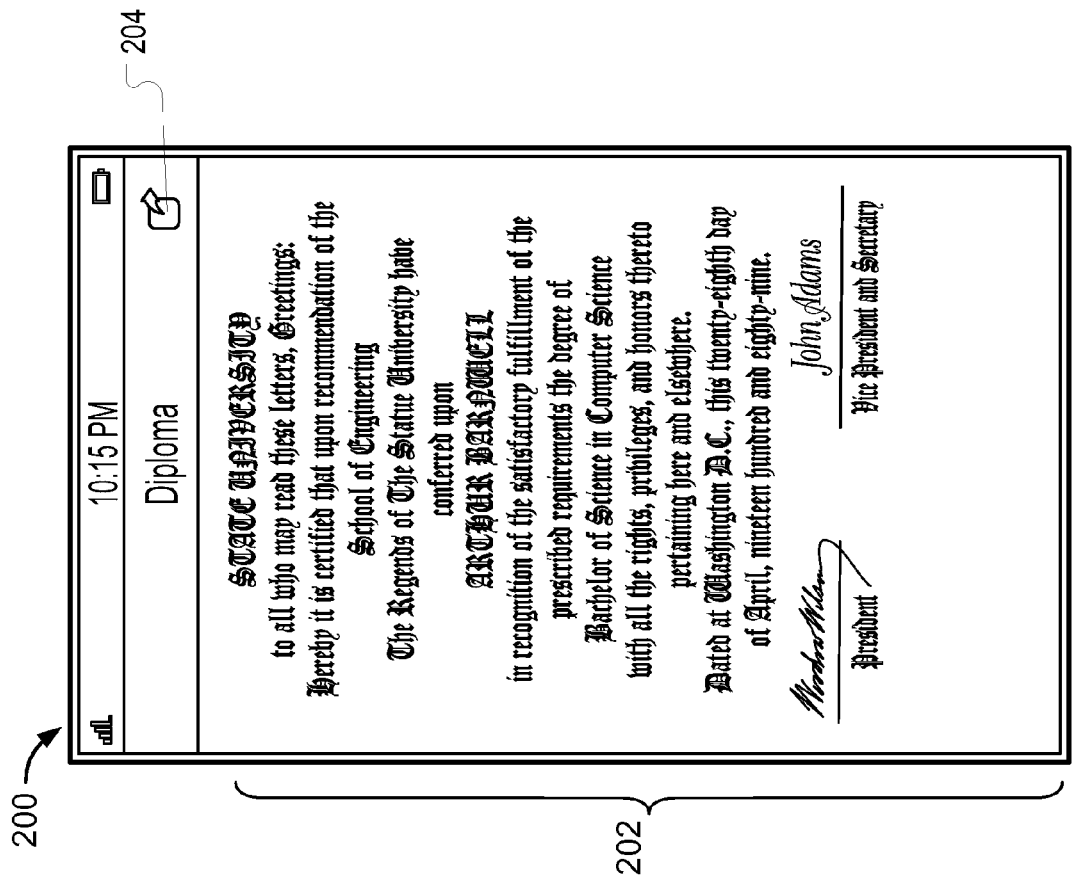

Referring to FIG. 2, graphical user interface 200 is displayed on a client device (not shown), e.g., following selection of the portion of graphical user interface 100 associated with indicator 106. Graphical user interface 200 displays a visual representation of electronic resource 202. In this example, electronic resource 202 is the electronic resource represented by indicator 106 (FIG. 1). Graphical user interface 200 also includes control 204 that, when selected, causes various mechanisms for sharing the electronic resource with other users to be presented to the user viewing graphical user interface 200.

Referring to FIG. 3, graphical user interface 300 displays various mechanisms for sharing an electronic resource (e.g., electronic resource 202 in FIG. 2) with resource recipients. In this example, graphical user interface 300 is displayed for a resource sharer and may be displayed following selection of control 204 (FIG. 2).

In the example of FIG. 3, graphical user interface 300 includes controls 302, 304, 306. Upon selection of control 302, the resource sharer selects to use an electronic mail message to share an electronic resource with a resource recipient. Upon selection of control 304, the resource sharer selects to use an ultrasonic audio signal to share an electronic resource with a resource recipient. Upon selection of control 306, the resource sharer selects to use a QR code to share an electronic resource with a resource recipient. Following selection of one of controls 302, 304, 306, a client device (e.g., the client device displaying graphical user interface 300) generates an electronic mail message, an ultrasonic audio signal or a QR code, respectively, for output by the client device of the resource sharer to a client device of a resource recipient.

In an example, the resource sharer chooses to use ultrasonic audio signals to share an electronic resource with a resource recipient. Referring to FIG. 4, graphical user interface 400 displays notification message 402, e.g., on a client device of a resource sharer and after the resource sharer has chosen to use ultrasonic audio signals to share the electronic resource with the resource recipient. In this example, notification message 402 informs the resource sharer to place the resource sharer's client device in proximity (e.g., geographic closeness) to the resource recipient's client device, e.g., to enable the resource sharer's client device to transfer an ultrasonic audio signal to the resource recipient's client device. Referring to FIG. 5, graphical user interface 500 displays notification message 502 for the resource sharer. In this example, notification message 502 notifies the resource sharer that an ultrasonic audio signal within which a reference to the shared electronic resource is encoded is being transmitted to the resource recipient's client device.

In another example, the resource sharer chooses to use a QR code to share an electronic resource with a resource recipient. In this example, the resource sharer's client device generates a QR code within which a reference to the shared electronic resource is encoded. Referring to FIG. 6, graphical user interface 600 displays QR code 602. In this example, QR code 602 may be generated by the resource sharer's client device. The resource sharer's client device displays QR code 602, e.g., to enable the resource recipient's client device to scan QR code 602 into the resource recipient's client device.

In an example, the resource recipient's client device receives the representation of the reference to the shared electronic resource. As described above, this representation may include a QR code and/or an ultrasonic audio signal. In this example, the resource recipient's client device decodes the representation, e.g., into a string. The resource recipient's client device passes the decoded representation (e.g., the string) to a server. In response, the server identifies a shared electronic resource that is represented by the decoded representation and makes the shared electronic resource accessible to the intended resource recipient. The server also informs the resource sharer that the transfer has been completed, as illustrated in graphical user interface 700 of FIG. 7.

Referring to FIG. 7, graphical user interface 700 displays selectable portion 702. In this example, selectable portion 702 may include a hyperlink and/or a control. Through selection of selectable portion 702, the resource sharer may send, to the server, information specifying that the electronic resource has been shared with a wrong resource recipient. Following selection of selectable portion 702, the resource sharer may be presented with an option to withdraw sharing of the electronic resource with the wrong resource recipient.

Figure 8A:
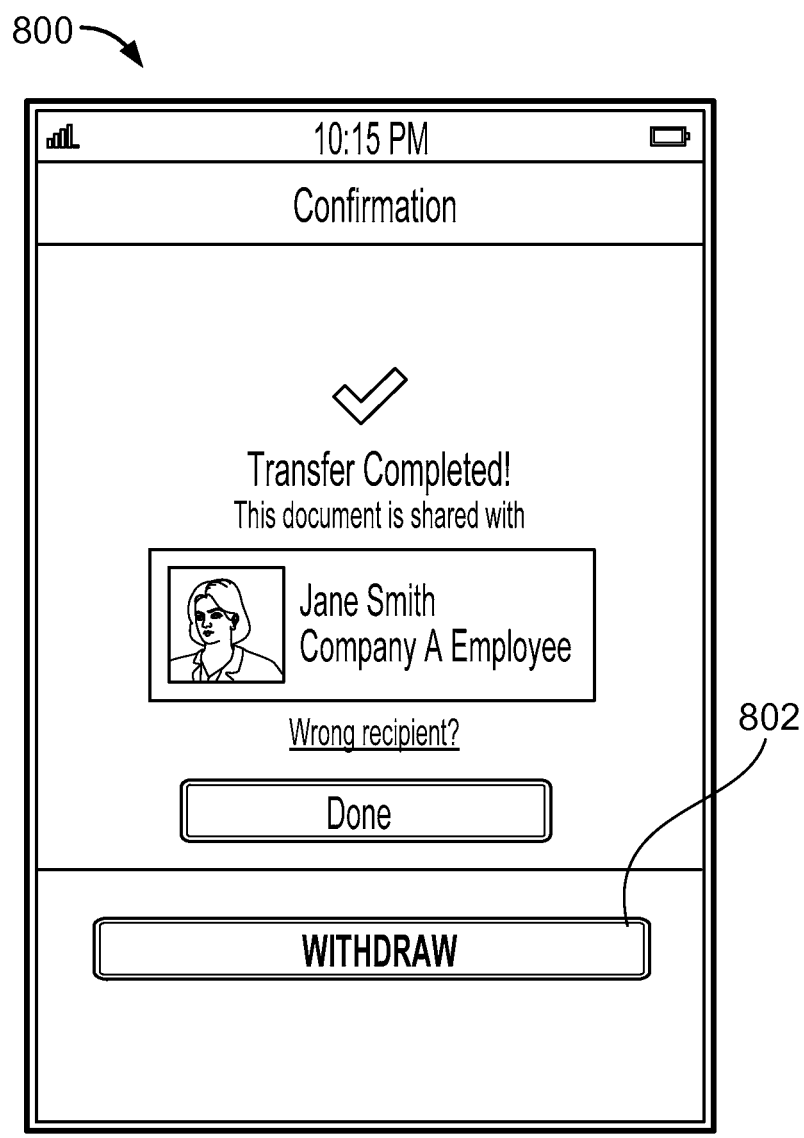

In this example, responsive to selection of selectable portion 702, graphical user interface 800 is displayed on the resource sharer's client device, as shown in FIG. 8A. In the example of FIG. 8A, graphical user interface 800 displays control 802, selection of which causes withdrawal (e.g., termination) of the wrong resource recipient's permission to access the shared electronic resource.

Referring back to FIG. 7, graphical user interface 700 also displays control 704, e.g., for the resource sharer. Upon selection of control 704, the resource sharer's client device sends, to the server, information specifying that the resource sharer is satisfied with completion of sharing of the electronic resource.

Figure 8B:
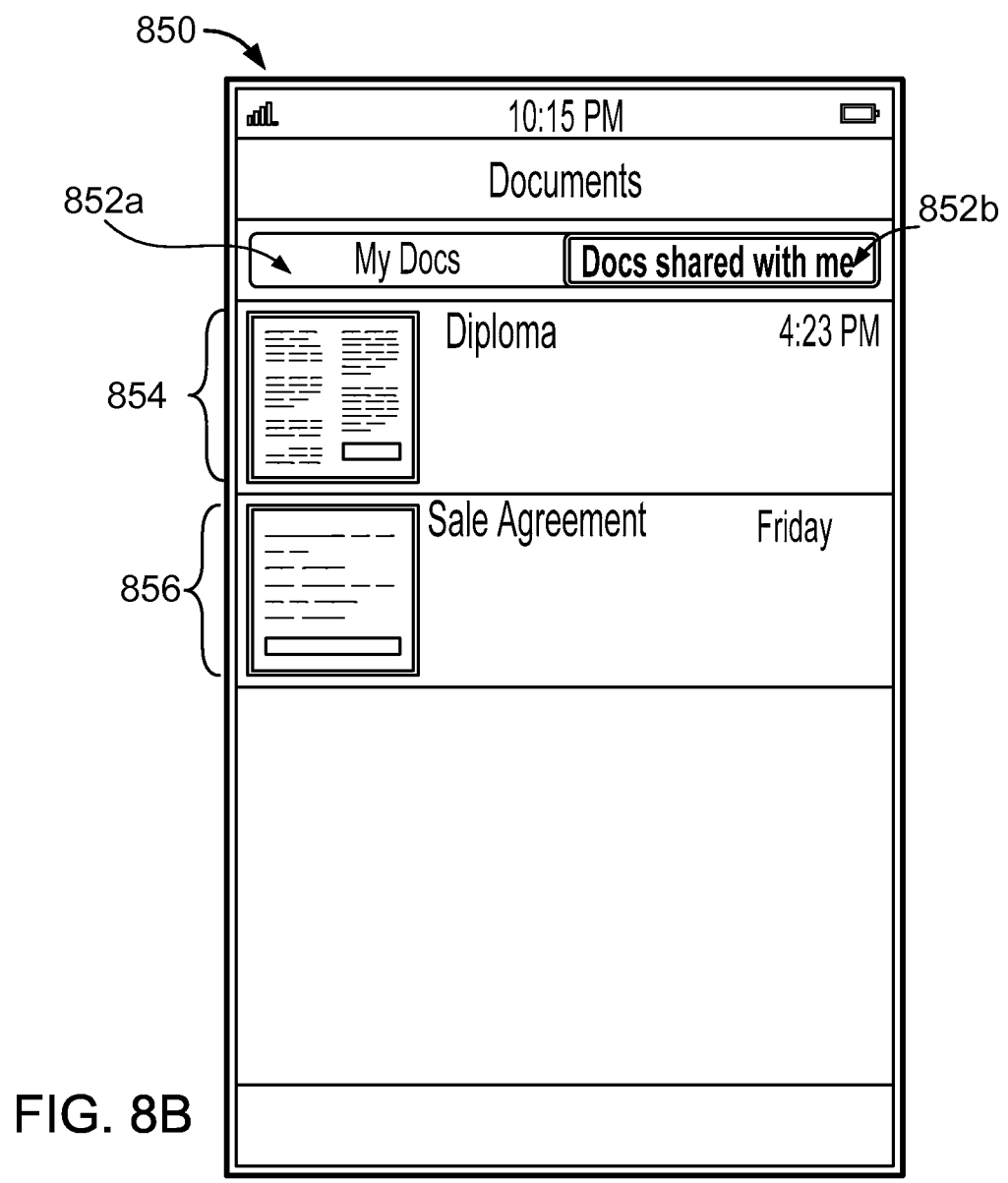

Referring to FIG. 8B, following completion of the transfer of the shared electronic resource with the resource recipient, the resource recipient's client device (not shown) displays graphical user interface 850. In this example, graphical user interface 850 includes controls 852a, 852b. Based on a selection of one of control 852a or control 852b, graphical user interface 850 can switch between views that show the list of electronic resources owned by the resource recipient and the list of electronic resources shared with the resource recipient, respectively. In the example of FIG. 8B, control 852b is selected, such that graphical user interface 850 displays indicators 854, 856 of electronic resources that are shared with the resource recipient.

In this example, indicator 854 represents electronic resource 202 (FIG. 2) that is shared with the resource recipient. In an example, the list of electronic resources shared with the resource recipient is updated to display indicator 854, e.g., when the resource sharer shares electronic resource 202 with the resource recipient through selection of one of controls 302, 304, 306 (FIG. 3). In another example, the list of electronic resources shared with the resource recipient is updated to display indicator 854, when the resource sharer specifies that the resource sharer is satisfied with completion of sharing of the electronic resource, e.g., through selection of control 704 (FIG. 7).

FIG. 9 is a block diagram of an example of a network environment 900 that enables sharing of electronic resources. Network environment 900 includes network 902, client devices 904, 910, server 916, and data repository 918. Network environment 900 may include many thousands of data repositories, client devices, and servers, which are not shown.

In an example, client device 904 is associated with user 906. In this example, user 906 is a resource sharer. Hereinafter, user 906 may be referred to as resource sharer 906, for purposes of convenience, and without limitation. In this example, client device 904 executes application 905, e.g., a mobile identity management application. Generally, an application includes a computer program with a graphical user interface. In this example, a mobile identity management application includes an application that allows a user to upload an electronic resource to a server and to associate the uploaded electronic resource with a code for sharing the uploaded electronic resource with other users.

Client device 910 is associated with user 912. In this example, user 912 is a resource recipient. Hereinafter, user 912 may be referred to as resource recipient 912, for purposes of convenience, and without limitation.

In the example of FIG. 9, resource sharer 906 uses client device 904 to upload electronic resource 920 to server 916. In an example, client device 904 uploads electronic resource 920 using a secure socket layer (SSL) or some other secure transfer mechanism. In this example, server 916 stores electronic resource 920 in data repository 918. Upon receipt of electronic resource 920, server 916 generates resource identifier (ID) 924 for electronic resource 920. Generally, a resource ID may include information that uniquely identifies an electronic resource. For example, resource ID 924 may include an alphanumeric string that uniquely identifies electronic resource 920. Server 916 generates, in data repository 918, an association between electronic resource 920 and resource ID 924. In this example, the association includes a pointer, e.g., a data structure that causes one item of data to reference another item of data.

Data repository 918 also stores user ID 926 for resource sharer 906. Generally, a user ID may include information that uniquely identifies a user. In this example, server 916 generates, in data repository 918, an association between user ID 926 and one or more of electronic resource 920 and resource ID 924, e.g., to specify that electronic resource 920 is uploaded to server 916 by resource sharer 906. In this example, when resource sharer 906 uploads electronic resource 920 to server 916, resource sharer 906 also transmits, to server 916, user ID 926, e.g., to enable server 916 to identify that resource sharer 906 is uploading electronic resource 920. In an example, server 916 initially generates user ID 926, e.g., when resource sharer 906 requests a user account for an application (not shown) on server 916. In this example, server 916 transmits user ID 926 to client device 904, e.g., to enable client device 904 to use user ID 926 when uploading electronic resource 920 to server 916.

In the example of FIG. 9, data repository 918 also stores key 928 of resource sharer 906. Generally, a key includes a sequence of symbols or characters. The key may be of any suitable length such as, for example, 80 bits, 128 bits, or 256 bits. In this example, key 928 is associated with user ID 926 in data repository 918, e.g., to specify that key 928 is for resource sharer 906. In an example, server 916 generates key 928, e.g., at the request of resource sharer 906. In another example, server 916 generates key 928, e.g., when resource sharer 906 creates an account on server 916 (and/or for an application running on server 916). Server 916 may transmit key 928 to client device 904 responsive to resource sharer 906 logging into server 916 (or an application executing on server 916). Key 928 provides server 916 and resource sharer 906 (or client device 904 associated with resource sharer 906) with an electronic secret, e.g., information that is only known to server 916 and resource sharer 906 (or client device 904 associated with resource sharer 906). As described in further detail below, through use of key 928, server 916 may verify the authenticity of information that purports to be associated with resource sharer 906.

In an example, resource sharer 906 desires to share electronic resource 920 with resource recipient 912. To promote sharing of electronic resource 920 with resource recipient 912, application 905 generates reference code 930 for electronic resource 920. Generally, a reference code may include information that references an item of data, e.g., an electronic resource. In the example of FIG. 9, reference code 930 references electronic resource 920.

In an example, reference code 930 may be valid for only a single use. In this example, after reference code 930 is used a single time to retrieve electronic resource 920, reference code 930 is invalidated and no longer can be used to retrieve electronic resource 920 (or another electronic resource). If resource sharer 906 desires to share electronic resource 920 with another user, client device 904 generates a new reference code. In still another example, reference code 930 may be temporary and expire at a predetermined time (e.g., after a predetermined time period). Client device 904 and/or server 916 may choose a time period for reference code 930, such as, for example, one minute, five minutes, or ten minutes.

Client device 904 generates reference code 930 based on various types of information. In an example, client device 904 generates reference code 930 at least partly based on identification information 931 and verification information 933. Generally, identification information 931 may include information that is at least partly based on other information that identifies an electronic resource and/or information that identifies a user. Generally, verification information 933 may include information that is used in verifying the authenticity of other information.

Figure 10A:
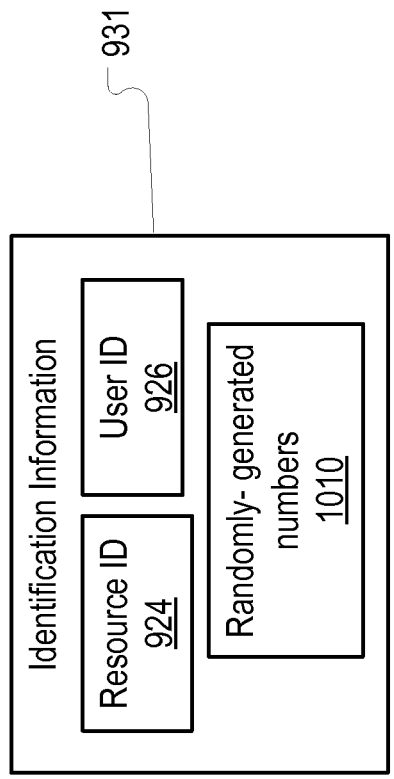
FIGS. 10A-10B are diagrams of examples of types of information used in generating a reference code for the sharing of an electronic resource.

Referring to FIG. 10A, client device 904 (FIG. 9) generates identification information 931 at least partly based on resource ID 924, user ID 926 and randomly generated numbers 1010. In this example, client device 904 includes a random number generator, e.g., to generate randomly generated numbers 1010. Client device 904 is also configured to store resource ID 924 and user ID 926, e.g., for use in generating identification information 931. In this example, server 916 (FIG. 9) may transmit, to client device 904, resource ID 924 and user ID 926.

Client device 904 may implement various techniques in generating identification information, including, e.g., identification information 931. For example, client 904 may generate identification information by concatenating together a resource ID, a user ID and/or randomly generated numbers. In this example, the resource ID, the user ID and/or the randomly generated numbers are concatenated together into a string. In another example, client 904 may generate identification information by applying various mathematical functions to the resource ID, the user ID and/or the randomly generated numbers.

In a variation of FIG. 10A, information specifying an identity of application 905 (FIG. 9) may be used in generating identification information 931. For example, client device 904 may be configured to implement numerous, different applications. In this example, identification information 931 is based on information specifying an identity of an application, e.g., for which identification information 931 is generated.

Figure 10B:
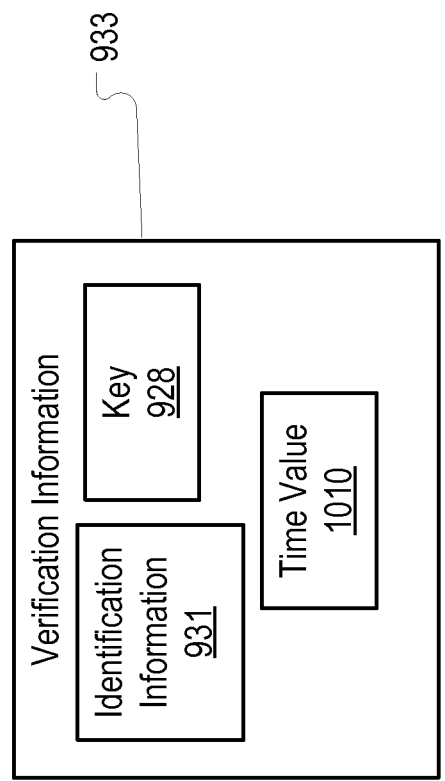

Referring to FIG. 10B, client device 904 generates verification information 933 at least partly based on identification information 931, key 928 and a time value 1010 (e.g., a time as specified by a clock on client device 904). In this example, server 916 transmits key 928 to client device 904, e.g., for use in generating verification information 933, which in-turn is used in generating reference code 930.

Client device 904 may implement various techniques in generating verification information, including, e.g., verification information 933. In an example, client device 904 concatenates together into a string various types of information, including, e.g., identification information, a key, and time values. In this example, the time value is generated by obtaining a current time (e.g., as specified by a clock on client device 904) and dividing it by a predefined number indicative of time units (e.g., units of five minutes). For example, the current time may be provided in seconds. In this example, the predefined number indicative of time units has a value of three-hundred, which represents three-hundred seconds or five minutes.

In this example, client device 904 applies a hash function, such as MD5, SHA-1 or SHA-2, to the string with the concatenated information to generate a hashed string of information. In some implementations, client device 904 may truncate the hashed string, by selecting a predetermined number of the last units of information (e.g., characters) in the hashed string (e.g., the last eight characters in the hashed string).

Referring back to FIG. 9, client device 904 uses reference code 930 in generating representation 908 of reference code 930. Generally, a representation of a reference code may include an audio signal or a visualization that is based on the reference code. Client device 904 generates various types of representations of reference code 930, including, e.g., an ultrasonic audio signal representation and an optical machine-readable representation (e.g., a bar code or a QR code). Client device 904 may transmit representation 908 to client device 910 using various transmission techniques, including, e.g., near field communications (NFC), Bluetooth, and so forth.

In an example, representation 908 may be valid for only a single use. In this example, after representation 908 is used a single time to retrieve electronic resource 920, representation 908 is invalidated and no longer can be used to retrieve electronic resource 920 (or another electronic resource). If resource sharer 906 desires to share electronic resource 920 with another user, client device 904 generates a new representation of a reference code. In another example, after resource sharer 906 causes representation 908 to be presented to client device 910, representation 908 is invalid for sharing electronic resource 920 with another resource recipient, e.g., independent of whether representation 908 was used to successfully transfer electronic resource 920 to resource recipient 912.

In an example, representation 908 may include a representation of a credential, e.g., a credential of resource sharer 906. In this example, server 916 may manage one or more credentials of individual users, and reference code 930 may be at least partly generated based on a credential for resource sharer 906 managed by server 916. For example, resource code 930 may be based on a credential ID, e.g., in addition to or instead of being based on user ID 926. Generally, a credential ID may include a number or character string that uniquely identifies a credential for a user. In an example, resource sharer 906 may select one of resource sharer's 906 credentials as a credential to be used in connection with sharing electronic resource 920 with resource recipient 912. In this example, reference code 930 may be based on the credential ID for the credential selected by resource sharer 906 as the credential to be used in connection with sharing electronic resource 920 with resource recipient 912.

In the example of FIG. 9, client device 904 transmits representation 908 to client device 910. In an example, representation 908 includes an ultrasonic audio signal (e.g., sound waves with frequency greater than approximately 20 kHz) within which representation 908 is encoded. In this example, a speaker (not shown) on client device 904 transmits the ultrasonic audio signal to client device 910. A microphone (not shown) on client device 910 receives the ultrasonic audio signal. In another example, representation 908 includes an optical machine-readable representation within which representation 908 is encoded. In this example, client device 910 includes a scanning device (not shown). In this example, resource recipient 912 uses the scanning device to scan the optical machine-readable representation into client device 910.

Following receipt of representation 908, client device 910 decodes representation 908 into decoded reference code 932, e.g., a string of characters. In this example, decoded reference code 932 includes identification information 934 and verification information 936. In this example, identification information 934 may be based on a resource ID, a user ID, randomly-generated numbers, a credential ID, and so forth. In this example, identification information 934 includes resource ID 924. Verification information 936 may be based on identification information 934 and a key. In an example, decoded reference code 932 is the same as reference code 930, e.g., when client device 910 correctly decodes representation 908. In this example, identification information 934 is the same as identification information 931 and verification information 936 is the same as verification information 933.

In the example of FIG. 9, client device 910 transmits decoded reference code 932 to server 916, e.g., to enable server 916 to validate that resource sharer 906 has authorized resource recipient 912 to access electronic resource 920. Using contents of decoded reference code 932, server 916 generates verification information 938. In this example, server 916 compares verification information 938 to verification information 936, which was provided to server 916 as part of decoded reference code 932. When verification information 938 corresponds to verification information 936, server 916 validates that resource sharer 906 has authorized resource recipient 912 to access electronic resource 920. Generally, a correspondence includes a match and/or a similarity between items of data. When verification information 938 differs from verification information 936, server 916 in unable to validate that resource sharer 906 has authorized resource recipient 912 to access electronic resource 920.

In the example of FIG. 9, server 916 generates verification information 938 based on identification information 934 and a key. As previously described, verification information may be generated based on identification information and a key. In this example, server 916 uses contents of identification information 934 to select a key for use in generating verification information 938. In this example, identification information 934 is the same as identification information 913, which includes user ID 926, as illustrated in the example of FIG. 10A. Using user ID 926, server 916 identifies that user ID 926 is associated with key 928 in data repository 918. Based on this association between user ID 926 and key 928, server 916 uses key 928 in generating verification information 938, e.g., in addition to using identification information 934. In this example, verification information 938 that is generated based on key 928 and identification information 934 corresponds to verification information 936, which is also based on identification information 934 and key 928. Based on the correspondence between verification information 936 and verification information 938, server 916 validates that resource sharer 906 has authorized resource recipient 912 to access electronic resource 920.

As previously described, server 916 uses key 928 in generating verification information 938. In this example, verification information 938 corresponds to verification information 936 when verification information 936 also corresponds to verification information 933, which was generated by client device 904 using key 928. That is, client device 910 does not generate verification information 936 directly from key 928. Rather, client device 910 determines verification information 936 by decoding representation 908, which itself is generated from reference code 930, which itself is generated using key 928. Accordingly, verification information 938 corresponds to verification information 936 because resource sharer 906 transmitted/presented representation 908 to client device 910.

In a variation of FIG. 9, server 916 determines that verification information 938 does not correspond to verification information 936. In this example, server 916 determines that resource sharer 906 has not authorized resource recipient 912 to access electronic resource 920. In another example, when server 916 determines that verification information 938 does not correspond to verification information 936, server 916 may generate another verification information that uses differing time values, e.g., to account for possible discrepancies in time between client device 904 and server 916 in generating verification information 933, 938, respectively. As previously described, a time value is one of the inputs that is used in generating verification information 933, 938.

In this example, server 916 may select the differing time values by incrementing and/or decrementing a current time value, e.g., as specified by a clock on (or otherwise accessible to) server 916. In this example, the current time value is incremented and/or decremented by a predefined amount of time (e.g., one minute, two minutes, five minutes, and so forth). In this example, server 916 determines if the verification information generated based on the differing time values correspond to verification information 936. If the verification information generated based on the differing time values correspond to verification information 936, server 916 validates that resource sharer 906 has authorized resource recipient 912 to access electronic resource 920. If the verification information generated based on the differing time values fail to correspond to verification information 936, server 916 is unable to validate that resource sharer 906 has authorized resource recipient 912 to access electronic resource 920.

Client device 904 may generate various, different types of representations for reference code 930. For example, client device 904 may generate optical machine-readable representations for reference code 930. An optical machine-readable representation may be an arrangement of graphical elements that encode alphanumeric data, where the elements are arranged so that the data can be read by an optical scanner. For example, an optical machine-readable representation may be a bar code or a QR code.

In the example of FIG. 9, client device 904 implements numerous techniques in generating optical machine-readable representations. In an example, client device 904 maps seed values (e.g., reference code 930, a user ID, a credential ID, and so forth) to a set of characters, e.g., using various techniques. For example, the characters in reference code 930 could be concatenated, manipulated using mathematical functions, encrypted using a cryptographic algorithm such as AES, hashed using a hash function such as MD5, SHA-1 or SHA-2, subsampled to select a predetermined subset or subsets, or any combination of these techniques to generate a suitable set of alphanumeric characters. Once the set of alphanumeric characters has been generated, client device 904 encodes the set of alphanumeric characters to generate an optical-machine readable representation, e.g., using various techniques. For example, client device 904 may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification.

In a variation of FIG. 9, the set of alphanumeric characters used in generating optical machine-readable representations may be generated by server 916, using the techniques described herein. In this example, server 916 transmits, to client device 904, the set of alphanumeric characters for use in optical machine-readable representations by client device 904.

In still another example, representation 908 includes an audio signal representation. In this example, client device 904 generates audio signals that represent reference code 930, e.g., by having reference code 930 encoded in the audio signals. In operation, client device 904 can use seed values (e.g., reference code 930, time, and so forth) to generate the audio signals. The time can be a current timestamp (e.g., time in seconds or milliseconds) obtained from a timing device such as a hardware or software clock located at client device 904. In some examples, the timing device can be synchronized with server 916, and/or with one or more additional servers that provide a master clock reference as described below. Additional seed values may be used, such as randomly generated numbers.

The seed values can be concatenated, manipulated using mathematical functions, hashed using a hash function such as MD5, SHA-1 or SHA-2, subsampled to select a predetermined subset or subsets, or any combination of these techniques. Client device 904 converts the seed values to corresponding audio signals, e.g., through use of a data to signal converter (e.g., a radio frequency transmission unit). In a variation of FIG. 9, the seed values and/or the predetermined subset(s) may be generated by server 916, using the techniques described herein. In this example, server 916 transmits, to client device 904, the seed values and/or the predetermined subset(s) that are generated by server 916.

The generated audio signal could be a human perceptible audible signal (e.g., a signal with frequency ranging from 20 Hz to 20 kHz), or it could be an ultrasonic audio signal (e.g., a signal with frequency that exceeds 20 kHz) that is detectable by a microphone on client device 910. As another example, recipient device 904 may transmit the audio signal to verifier device 910 using electronic radio-frequency communications, e.g., NFC or Bluetooth.

In a variation of FIG. 9, a credential ID (not shown) for resource sharer 906 may be used in generating reference code 930. In this example, the credential ID may be used in addition to or in place of user ID 926. In this example, server 916 manages credentials associated with users.

In operation, server 916 manages and stores one or more credentials, associates users with appropriate credentials, and provides credential IDs and/or representations of the credentials to users' client devices and/or to processing systems. Credentials may be stored in data repository 918. In this example, server 916 transmits, to client device 904, one or more credentials for resource sharer 906 and/or one or more corresponding credential IDs for resource sharer 906. As described herein, client device 904 may use a credential and/or the corresponding credential identifier in generating a reference code for an electronic resource to be shared with another user. When client device 904 uses the credential and/or the credential identifier in generating a reference code, the representation (e.g., representation 908) that is generated by client device 904 includes a representation of a credential for resource sharer 906.

In an example, server 916 generates a credential based on input provided by a credential grantor (not shown). Generally, a credential grantor includes an entity that grants a credential to a user. For example, a credential grantor may be a party host or an event organizer, when the credential is a credential to gain access to a party or an event. In another example, the credential grantor may be a financial institution, e.g., when the credential is a credential to gain access to a financial account. In still other examples, the credential grantor may be a business, e.g., when the credential is an employee badge, or the credential grantor may be a college or university, e.g., when the credential represents that the credential holder studied at a particular college or university. In yet another example, the credential grantor may be a government agency, e.g., when the credential is a government-issued identification (e.g., a driver's license, a passport, etc.) A credential may include a variety of information, including, e.g., a description of an entity granting the credential (e.g., a bank, a school, an employer, an event, a location, and so forth), a credential identifier, and/or one or privileges available to credential holders.

Server 916 may associate electronic resource 920 with various conditions to be satisfied, prior to resource recipient 912 being granted access to electronic resource 920. As previously described, one condition is successful validation, e.g., by server 916, that resource recipient 912 is authorized to access electronic resource 620. Another condition may include that resource recipient 912 and resource sharer 906 have credentials issued by a same entity. In this example, server 916 may manage credentials issued for multiple different entities (e.g., organizations). In this example, resource sharer 906 may select a particular one of resource sharer's 906 credentials to be used in sharing electronic resource 920 with resource recipient 912. Consequently, in order for resource recipient 912 to access electronic resource 920, resource recipient 912 may be required to have a credential issued by the same organization as the credential that resource sharer 906 selected to be used in connection with sharing electronic resource 920. For example, resource sharer 906 may select an employee badge for Company X to be used in connection with sharing electronic resource 920. In this example, when resource recipient 912 attempts to access electronic resource 920 using decoded reference code 932, server 916 checks to confirm that resource recipient 912 also has an employee badge for Company X before enabling resource recipient 912 to access electronic resource 920 from client device 910.

In some implementations, an indication of the credential selected by resource sharer 906 to be used in connection with sharing electronic resource 920 may be included within representation 908, and server 916 may be able to determine that resource recipient 912 is not to be allowed to access electronic resource 920 unless resource recipient 912 also has a credential issued by the same organization as the credential selected by resource sharer 906 based on the inclusion of the indication of the selected credential in representation 908. Additionally or alternatively, client device 904 may transmit an indication of the credential selected by resource sharer 906 to be used in connection with sharing electronic resource 920 to server 916, and server 916 may be able to determine that no user is to be allowed to access electronic resource 920 unless the user also has a credential issued by the same organization as the credential selected by resource sharer 906 based on this transmission.

In another variation of FIG. 9, rather than client device 904 generating a representation that references an electronic resource to be shared (e.g., electronic resource 920), server 916 may generate a representation and associate the generated representation with electronic resource 920 in data repository 918. In this example, the representation may also include information identifying electronic resource 920, e.g., a resource ID. Server 916 may generate the representation using one or more of the above-described techniques for generating representations. In this example, server 916 transmits the representation to client device 904. When resource sharer 906 wants to share electronic resource 920 with resource recipient 912, resource sharer 906 causes client device 910 to receive the representation that was generated by server 916. In an example, the representation is a QR code. In this example, resource sharer 906 allows resource recipient 912 to use a scanning device to scan the QR code into client device 910. In this example, client device 910 transmits the representation back to server 916.

Using the resource ID included in the representation, server 916 identifies the electronic resource for which resource recipient 912 is requesting access. Server 912 compares the received representation to a representation associated with the identified electronic resource. If server 916 determines a correspondence between the received representation and the representation associated with the identified electronic resource, server 916 determines that resource recipient 912 is authorized to access the identified resource, e.g., because resource sharer 906 has shared the representation for the identified resource with resource recipient 912. If server 916 fails to determine a correspondence between the received representation and the representation associated with the identified electronic resource, server 916 determines that resource recipient 912 is not authorized to access the identified resource.

In some examples, some of the representations generated by server 916 may be temporary and expire at a predetermined time (e.g., after a predetermined time period). Server 916 may choose a time period for the representations, such as, for example, one minute, five minutes, or ten minutes. The expiration time for the corresponding representation can be associated with the representation. For example, the expiration time may be an entry in data repository 918 that is included with the entry for the representation.

In another variation of FIG. 9, client device 904 may enable resource sharer 906 to electronically sign electronic resource 920, e.g., using a private key of resource sharer 906 before resource sharer 906 uploads electronic resource 920 to server 916. Additionally or alternatively, client device 904 may hash electronic resource 920 and electronically sign the hashed electronic resource using the private key of resource sharer 906. In this example, resource recipient 912 may have a corresponding public key of resource sharer 906. Generally, a private key includes a value that is only known to a particular entity. Generally, a public key includes a value that may be publically known. In this example, the public and private keys are related in such a way that only the private key can be used to encrypt messages and only the corresponding public key can be used to decrypt the messages, or vice versa. Using the public key, after access to electronic resource 920 is granted to resource recipient 912, resource recipient 912 can verify that electronic resource 920 remains unchanged, e.g., from when resource sharer 906 uploaded electronic resource 920 to server 916.

In the example of FIG. 9, client device 910 is configured to implement application 911, e.g., similar to or the same as application 905. In this example, client device 910 uses application 911 to receive reference code 930, to generate decoded reference code 932, to send communications to server 916, and/or to perform other above-described operations of client device 910.

In an example, one of the communications (sent from application 911) may include decoded reference code 932. In this example, application 911 causes the communications to be electronically signed with an electronic signature for application 911, e.g., to enable server 916 to identify the application (e.g., application 911) from which the communications are sent. In this example, server 916 may use the identity of application 911 from which the communications are sent in selecting a verification information algorithm to use in generating verification information 938. For example, certain applications may be associated with certain verification information algorithms, and other applications may be associated with other verification information algorithms.

Figure 11:
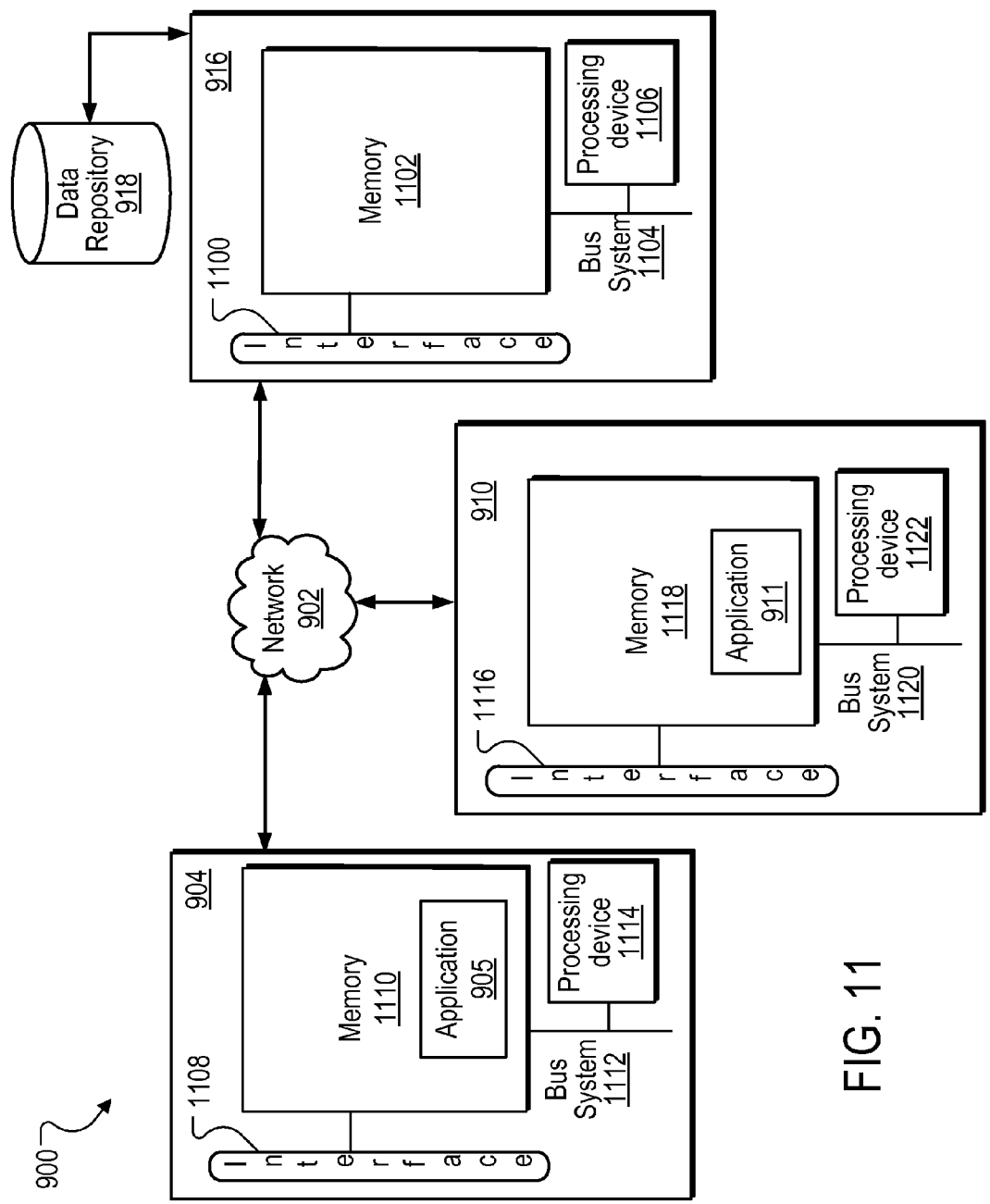
FIG. 11 is a block diagram showing examples of components of a network environment that enables the sharing of electronic resources.

FIG. 11 is a block diagram showing examples of components of network environment 900 that enables sharing of electronic resources. Server 916 can be a variety of computing devices capable of receiving data and running one or more services, including, e.g., an application, which can be accessed by client devices 904, 910. In an example, server 916 can include a distributed computing system, a desktop computer, a laptop, a cell phone, a rack-mounted server, and the like. Server 916 can be a single server or a group of servers that are at the same position or at different positions. Server 916 and each of client devices 904, 910 can execute programs having a client-server relationship to each other. Although distinct modules are shown in FIG. 11, in some examples, client and server programs can execute on the same device.

Server 916 can receive data from client devices 904, 910 through input/output (I/O) interface 1100. I/O interface 1100 can be a type of interface capable of receiving data over a network, including, e.g., an Ethernet interface, a wireless networking interface, a fiber-optic networking interface, a modem, and so forth. Server 916 also includes a processing device 1106 and memory 1102. A bus system 1104, including, for example, a data bus and a motherboard, can be used to establish and to control data communication between the components of server 916.

Processing device 1106 can include one or more microprocessors. Generally, processing device 1106 can include an appropriate processor and/or logic that is capable of receiving and storing data, and of communicating over a network (e.g., network 902). Memory 1102 can include a hard drive and a random access memory storage device, including, e.g., a dynamic random access memory, or other types of non-transitory machine-readable storage devices. As shown in FIG. 11, memory 1102 stores computer programs that are executable by processing device 1106. These computer programs may include an application for implementing the operations and/or the techniques described herein. The application can be implemented in software running on a computer device (e.g., server 916), hardware or a combination of software and hardware.

In the example of FIG. 11, client device 904 can be a variety of computing devices capable of receiving data and running one or more services, including, e.g., an application (not shown). In an example, client device 904 can include a server, a distributed computing system, a desktop computer, a laptop, a tablet, a smart phone, a cell phone, a rack-mounted server, and the like.

Client device 904 can receive data from client device 910 and from server 916 through I/O interface 1108. I/O interface 1108 can be a type of interface capable of receiving data over a network, including, e.g., an Ethernet interface, a wireless networking interface, a fiber-optic networking interface, a modem, and so forth. Client device 904 also includes a processing device 1114 and memory 1110. A bus system 1112, including, for example, a data bus and a motherboard, can be used to establish and to control data communication between the components of client device 904.

Processing device 1114 can include one or more microprocessors. Generally, processing device 1114 can include an appropriate processor and/or logic that is capable of receiving and storing data, and of communicating over network (902). Memory 1110 can include a hard drive and a random access memory storage device, including, e.g., a dynamic random access memory, or other types of non-transitory machine-readable storage devices. As shown in FIG. 11, memory 1110 stores computer programs that are executable by processing device 1114. These computer programs may include application 905 for implementing the operations and/or the techniques described herein. Application 905 can be implemented in software running on client device 904, hardware or a combination of software and hardware.

In the example of FIG. 11, client device 910 can also be a variety of computing devices capable of receiving data and running one or more services, including, e.g., an application (not shown). In an example, client device 910 can include a server, a distributed computing system, a desktop computer, a laptop, a tablet, a smart phone, a cell phone, a rack-mounted server, and the like.

Client device 910 can receive data from client device 904 and from server 916 through I/O interface 1116. I/O interface 1116 can be a type of interface capable of receiving data over a network, including, e.g., an Ethernet interface, a wireless networking interface, a fiber-optic networking interface, a modem, and so forth. Client device 910 also includes a processing device 1122 and memory 1118. A bus system 1120, including, for example, a data bus and a motherboard, can be used to establish and to control data communication between the components of client device 910.

Processing device 1122 can include one or more microprocessors. Generally, processing device 1122 can include an appropriate processor and/or logic that is capable of receiving and storing data, and of communicating over network (902). Memory 1118 can include a hard drive and a random access memory storage device, including, e.g., a dynamic random access memory, or other types of non-transitory machine-readable storage devices. As shown in FIG. 11, memory 1118 stores computer programs that are executable by processing device 1122. These computer programs may include application 911 for implementing the operations and/or the techniques described herein. The application can be implemented in software running on client device 910, hardware or a combination of software and hardware.

Figure 12:
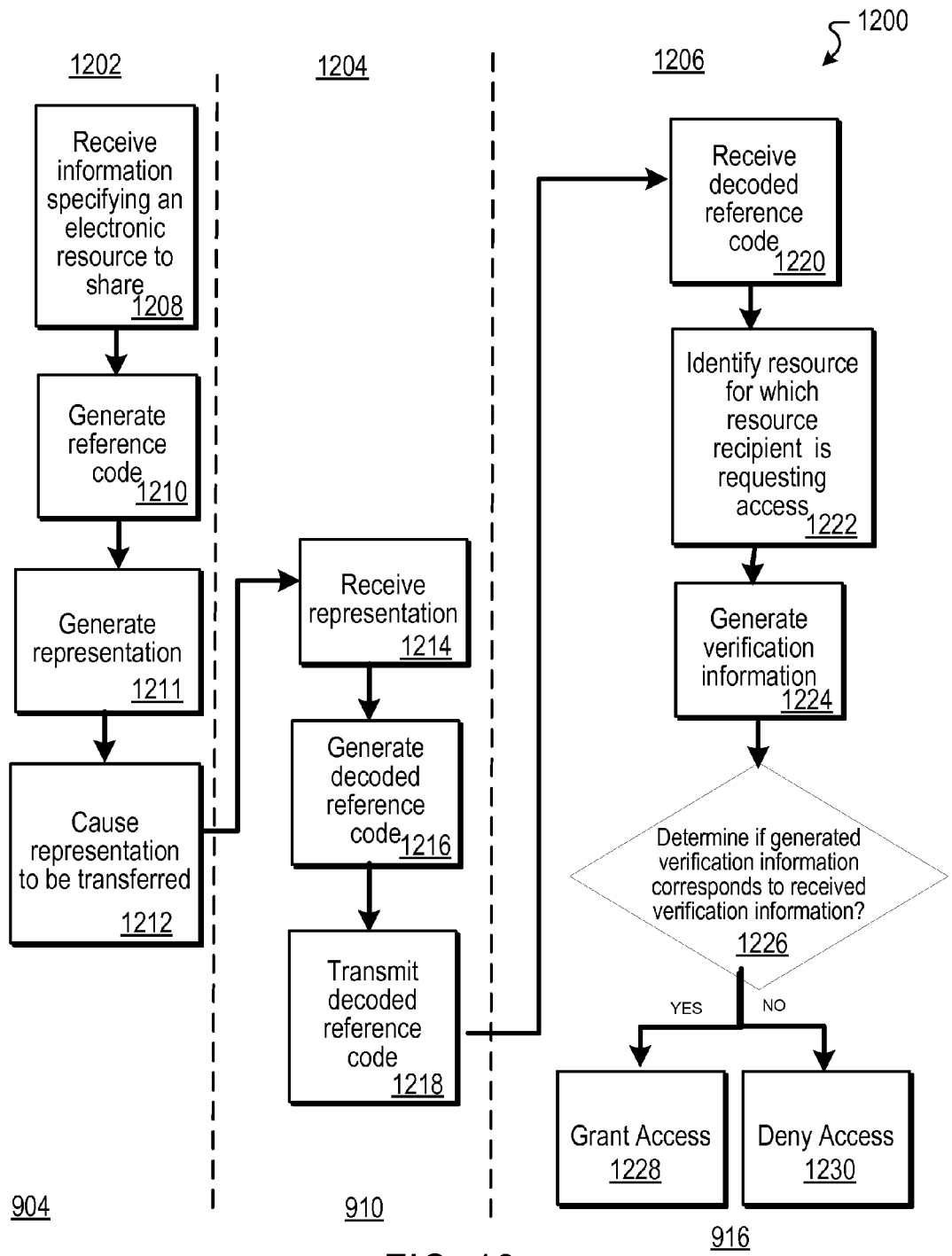
FIG. 12 is a flowchart showing an example of a process for sharing of electronic resources.

FIG. 12 is a flowchart showing an example of a process 1200 for sharing of electronic resources. In FIG. 12, process 1200 is split into parts 1202, 1204, 1206. Part 1202 may be performed by client device 904 (and/or by application 905 running on client device 904). Part 1204 may be performed by client device 910 (and/or by application 911 running on client device 910). Part 1206 may be performed by server 916 (and/or by an application running on server 916).

In operation, client device 904 receives (1208) information specifying an electronic resource to be shared with resource recipient 912. In this example, resource sharer 906 inputs into client device 904 information specifying that electronic resource 920 is to be shared with resource recipient 912. For example, the information may be input into one or more graphical user interfaces displayed on client device 904.

In response, client device 904 generates (1210) a reference code (e.g., reference code 930), e.g., using the above-described techniques. Using the generated reference code, client device 904 also generates (1211) a representation (e.g., representation 908) of the reference code.

In the example of FIG. 12, client device 904 causes (1212) the representation to be transferred to client device 910. In an example, the representation includes an ultrasonic audio signal. In this example, client device 904 causes the representation be transferred by using a speaker (not shown) on client device 904 to transmit the ultrasonic audio signal to client device 910. A microphone (not shown) on client device 910 receives the ultrasonic audio signal. In another example, the representation includes an optical machine-readable representation. In this example, client device 910 includes a scanning device (not shown). In this example, client device 904 causes the representation be transferred by displaying the representation such that resource recipient 912 can use the scanning device to scan the optical machine-readable representation into client device 910. In this example, client device 910 receives (1214) the representation.

In response, client device 910 generates (1216) a decoded reference code (e.g., decoded reference code 932), e.g., by decoding the received representation. Client device 910 also transmits (1218), to server 916, the decoded reference code. In this example, client device 910 transmits, to server 916, a request for access to an electronic resource that is shared with resource recipient 912. The request includes the decoded reference code.

In response, server 916 receives (1220) the decoded reference code. Using the received decoded reference code, server 916 identifies (1222) a resource for which resource recipient 912 is requesting access. As previously described, the decoded reference code includes identification information, which includes a reference ID for the resource for which resource recipient 912 is requesting access. In this example, server 916 parses the decoded reference code to identify the reference ID for the resource for which resource recipient 912 is requesting access.

Using contents of the decoded reference code, server 916 also identifies a key (e.g., key 928) for resource sharer 906, e.g., as previously described. Using the identification information included in the decoded reference code and the identified key, server 916 generates (1224) verification information (e.g., verification information 938). In this example, the received decoded reference code also includes verification information. Server 916 determines (1226) if the generated verification information corresponds to the received verification information, e.g., the verification information received in the decoded reference code. If the generated verification information corresponds to the received verification information, server 916 validates that resource sharer 906 has authorized resource recipient 912 to access the shared electronic resource (e.g., electronic resource 920). In this example, server 916 grants (1228), to resource recipient 912, access to the shared electronic resource, e.g., by sending the shared electronic resource to client device 910, by sending client device 910 a code for accessing the shared electronic resource, by enabling client device 910 to access a read only version of a remotely stored copy of electronic resource 120, and so forth. In some implementations, server 916 may identify resource recipient 912 (e.g., based on information included in or associated with the transmission of the decoded reference code) and consider the identity of resource recipient 912 before granting resource recipient 912 access to shared electronic resource 920. For example, in some such implementations, server 916 may maintain a whitelist of users who are authorized to access electronic resource 920 (or, more generally, electronic resources shared by resource sharer 906) and server 916 may determine to grant resource recipient 912 access to shared electronic resource 920 only if resource recipient 912 is included in the whitelist. Additionally or alternatively, server 916 may maintain a blacklist of users who are not authorized to access electronic resource 920 (or, more generally, electronic resources shared by resource sharer 906) and server 916 may determine to grant resource recipient 912 access to shared electronic resource 920 only if resource recipient 912 is not included on the blacklist. In some implementations, server 916 may confirm with resource sharer 906 that resource recipient 912 is authorized to access electronic resource 920 before granting resource recipient 912 access to shared electronic resource 920.

If the generated verification information fails to correspond to the received verification information, server 916 is unable to validate that resource sharer 906 has authorized resource recipient 912 to access the shared electronic resource (e.g., electronic resource 920). In this example, server 916 denies (1230) resource recipient 912 access to the shared electronic resource. Following the denial of access, server 916 may send, to client device 910, information notifying resource recipient 912 of the denial of access to the electronic resource for which resource recipient 912 has requested access.

Using the techniques described herein, an application enables a user to upload an electronic resource to a server and to associate the uploaded electronic resource with the user (e.g., through an association with a user ID for the user). Following uploading of the electronic resource, the user can share the electronic resource with a resource recipient, e.g., by providing the resource recipient with a representation that references the electronic resource. A client device of the resource recipient may decode the representation and present the decoded representation to the server. Using the decoded representation, the server may validate whether the resource recipient is authorized to access the shared electronic resource.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible program carrier for execution by, or to control the operation of, a processing device. Alternatively or in addition, the program instructions can be encoded on a propagated signal that is an artificially generated signal, e.g., a machine-generated electrical, optical, or electromagnetic signal that is generated to encode data for transmission to suitable receiver apparatus for execution by a processing device. The machine-readable medium can be a machine-readable storage device, a machine-readable storage substrate, a random or serial access memory device, or a combination of one or more of them.

The term "processing device" encompasses all kinds of apparatus, devices, and machines for processing data, including by way of example a programmable processor, a computer, or multiple processors or computers. The processing device can include special purpose logic circuitry, e.g., an FPGA (field programmable gate array) or an ASIC (application-specific integrated circuit). The processing device can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more processing devices, comprising:
   receiving, from a first client device, a request to share an electronic resource of a first user, wherein the first user is associated with the first client device;
   transmitting, to the first client device, a resource identifier for the electronic resource of the first user, wherein the resource identifier is used in generating a reference code for the shared electronic resource of the first user, wherein the reference code enables the first user to share the electronic resource with another user of another client device, and wherein the reference code includes or encodes verification information to verify that a client device receiving the reference code is authorized to access an electronic resource referenced by the reference code;
   receiving, from a second client device, (i) a request for access to an electronic resource that is shared with a second user of the second client device, and (ii) reference code information for the requested electronic resource, with the received reference code information including or encoding first verification information to verify whether the second user is authorized to access the requested electronic resource;
   identifying, based on contents of the received reference code information, that a resource identifier of the requested electronic resource matches the resource identifier of the shared electronic resource;
   in response to identifying that the second user is requesting access to the shared electronic resource,
      verifying that the first client device has transmitted the generated reference code to the second client device by:
         retrieving, based on contents of the received reference code information, key information for the shared electronic resource;
         generating second verification information using (i) at least part of the contents of the received reference code information, and (ii) the key information; and
         determining a correspondence between the first verification information received from the second client device and the second verification information generated;
   as a consequence of having determined the correspondence, determining that the second user of the second client device is authorized to access the electronic resource of the first user; and
   as a consequence of having determined that the second user of the second client device is authorized to access the electronic resource of the first user, enabling the second client device to access the electronic resource of the first user.

2. The method of claim 1, wherein the received reference code information comprises a decoded representation of the reference code for the electronic resource that is shared with the second user.

3. The method of claim 1, wherein the received reference code information is based on the reference code for the electronic resource that is shared with the second user and is based on a representation of the reference code for the electronic resource that is shared with the second user;
   wherein the representation comprises one or more of an ultrasonic audio signal representation and an optical machine-readable representation.

4. The method of claim 1, further comprising:
   generating the resource identifier; and
   wherein the first client device generates the reference code for the electronic resource of the first user based on the resource identifier.

5. The method of claim 1, wherein the request received from the second client device provides an indication of the second user of the second client device.

6. The method of claim 1, wherein the reference code for the electronic resource of the first user is usable a single time to retrieve the electronic resource of the first user.

7. The method of claim 1, further comprising invalidating the reference code for the electronic resource of the first user after determining that the second user of the second client device is authorized to access the electronic resource of the first user.

8. The method of claim 1, further comprising:
   storing the information corresponding to the electronic resource of the first user in association with the resource identifier, prior to generation of the resource code for the electronic resource of the first user.

9. The method of claim 1, wherein the electronic resource of the first user is associated with a credential for the first user of the first client device;
- wherein access, by the second user, to the electronic resource of the first user is conditioned on the second user having a credential that corresponds to the credential for the first user; and
- wherein determining that the second user of the second client device is authorized to access the electronic resource of the first user further comprises:
- determining a correspondence between a credential of the second user of the second client device and the credential for the first user of the first client device, and
- as a consequence of having determined the correspondence between the credential of the second user of the second client device and the credential for the first user of the first client device, determining that the second user of the second client device is authorized to access the electronic resource of the first user.

10. The method of claim 1, wherein the electronic resource of the first user is digitally signed using a private key of the first user of the first client device; and
- wherein the method further comprises:
- using a public key associated with the first user and maintained by the second client device to verify that contents of the electronic resource of the first user, at a time when the second client device is enabled to access the electronic resource of the first user, are unchanged from contents of the electronic resource of the first user, at a time when the information corresponding to the electronic resource of the first user is received.

11. The method of claim 1, wherein the request received from the second client device includes an electronic signature of an application on the second client device to indicate to the one or more processing devices that the request originated from the application on the second client device.

12. The method of claim 1, further comprising:
- sending, to the first client device, a notification of enabling the second user of the second client device to access the electronic resource of the first user.

13. The method of claim 1, further comprising:
- after enabling the second user of the second client device to access the electronic resource of the first user, receiving, from the first client device, information requesting that the second user's authorization to access the electronic resource of the first user be terminated; and
- as a consequence of having received the information requesting that the second user's access to the electronic resource of the first user be terminated, terminating the second user's authorization to access the electronic resource of the first user.

14. The method of claim 1, wherein the resource identifier is associated with a credential identifier for the first user.

15. One or more non-transitory machine-readable media configured to store instructions that are executable by one or more processing devices to perform operations comprising:
- receiving, from a first client device, a request to share an electronic resource of a first user, wherein the first user is associated with the first client device;
- transmitting, to the first client device, a resource identifier for the electronic resource of the first user, wherein the resource identifier is used in generating a reference code for the shared electronic resource of the first user, wherein the reference code enables the first user to share the electronic resource with another user of another client device, and wherein the reference code includes or encodes verification information to verify that a client device receiving the reference code is authorized to access an electronic resource referenced by the reference code;
- receiving, from a second client device, (i) a request for access to an electronic resource that is shared with a second user of the second client device, and (ii) reference code information for the requested electronic resource, with the received reference code information including or encoding first verification information to verify whether the second user is authorized to access the requested electronic resource;
- identifying, based on contents of the received reference code information, that a resource identifier of the requested electronic resource matches the resource identifier of the shared electronic resource;
- in response to identifying that the second user is requesting access to the shared electronic resource,
  - verifying that the first client device has transmitted the generated reference code to the second client device by:
  - retrieving, based on contents of the received reference code information, key information for the shared electronic resource;
  - generating second verification information using (i) at least part of the contents of the received reference code information, and (ii) the key information;
- determining a correspondence between the first verification information received from the second client device and the second verification information generated;
- as a consequence of having determined the correspondence, determining that the second user of the second client device is authorized to access the electronic resource of the first user; and
- as a consequence of having determined that the second user of the second client device is authorized to access the electronic resource of the first user, enabling the second client device to access the electronic resource of the first user.

16. The one or more non-transitory machine-readable media of claim 15, wherein the received reference code information comprises a decoded representation of the reference code for the electronic resource that is shared with the second user.

17. The one or more non-transitory machine-readable media of claim 15, wherein the received reference code information is based on the reference code for the electronic resource that is shared with the second user and is based on a representation of the reference code for the electronic resource that is shared with the second user;
- wherein the representation comprises one or more of an ultrasonic audio signal representation and an optical machine-readable representation.

18. An electronic system comprising:
- one or more processing devices; and
- one or more machine-readable media configured to store instructions that are executable by the one or more processing devices to perform operations comprising:
  - receiving, from a first client device, a request to share an electronic resource of a first user, wherein the first user is associated with the first client device;
  - transmitting, to the first client device, a resource identifier for the electronic resource of the first user, wherein the resource identifier is used in generating a reference code for the shared electronic resource of the first user, wherein the reference code enables the first user to share the electronic resource with another user of another client device, and wherein the reference code includes or encodes verification information to verify that a client device receiving the reference code is authorized to access an electronic resource referenced by the reference code;

receiving, from a second client device, (i) a request for access to an electronic resource that is shared with a second user of the second client device, and (ii) reference code information for the requested electronic resource, with the received reference code information including or encoding first verification information to verify whether the second user is authorized to access the requested electronic resource;

identifying, based on contents of the received reference code information, that a resource identifier of the requested electronic resource matches the resource identifier of the shared electronic resource;

in response to identifying that the second user is requesting access to the shared electronic resource,
verifying that the first client device has transmitted the generated reference code to the second client device by:

retrieving, based on contents of the received reference code information, key information for the shared electronic resource;

generating second verification information using (i) at least part of the contents of the received reference code information, and (ii) the key information;

determining a correspondence between the first verification information received from the second client device and the second verification information generated;

as a consequence of having determined the correspondence, determining that the second user of the second client device is authorized to access the electronic resource of the first user; and as a consequence of having determined that the second user of the second client device is authorized to access the electronic resource of the first user, enabling the second client device to access the electronic resource of the first user.

19. The electronic system of claim 18, wherein the received reference code information comprises a decoded representation of the reference code for the electronic resource that is shared with the second user.

20. The electronic system of claim 18, wherein the first received reference code information is based on the reference code for the electronic resource that is shared with the second user and is based on a representation of the reference code for the electronic resource that is shared with the second user;
wherein the representation comprises one or more of an ultrasonic audio signal representation and an optical machine-readable representation.

* * * * *

UNITED STATES PATENT AND TRADEMARK OFFICE
CERTIFICATE OF CORRECTION

| | | |
|---|---|---|
| PATENT NO. | : 9,076,006 B1 | Page 1 of 1 |
| APPLICATION NO. | : 13/791216 | |
| DATED | : July 7, 2015 | |
| INVENTOR(S) | : Michael J. Saylor et al. | |

It is certified that error appears in the above-identified patent and that said Letters Patent is hereby corrected as shown below:

In the Claims

In claim 20, column 26, line 19 (approx.), after "the" delete "first".

Signed and Sealed this
Eighth Day of December, 2015

Michelle K. Lee
*Director of the United States Patent and Trademark Office*